(12) United States Patent
Ishida et al.

(10) Patent No.: US 7,574,795 B2
(45) Date of Patent: Aug. 18, 2009

(54) METHOD OF MANUFACTURING CONNECTING ROD

(75) Inventors: Masao Ishida, Saitama (JP); Toyotaka Kinoshita, Saitama (JP)

(73) Assignee: Honda Motor Co., Ltd., Minato-Ku Tokyo (JP)

( * ) Notice: Subject to any disclaimer, the term of this patent is extended or adjusted under 35 U.S.C. 154(b) by 329 days.

(21) Appl. No.: 11/403,864

(22) Filed: Apr. 14, 2006

(65) Prior Publication Data
US 2006/0231164 A1 Oct. 19, 2006

(30) Foreign Application Priority Data
Apr. 15, 2005 (JP) .............................. 2005-117820

(51) Int. Cl.
*B23P 17/00* (2006.01)
(52) U.S. Cl. .............................. 29/888.092; 29/888.09; 29/413; 384/294; 384/430; 225/100
(58) Field of Classification Search .................. 29/412, 29/413, 414, 888.09, 888.92, 888.092; 148/206; 384/294, 430; 225/100
See application file for complete search history.

(56) References Cited

U.S. PATENT DOCUMENTS

| | | | | |
|---|---|---|---|---|
| 4,569,109 A | * | 2/1986 | Fetouh | ..................... 29/888.09 |
| 4,768,694 A | * | 9/1988 | Fabris et al. | ................... 225/94 |
| 5,568,891 A | * | 10/1996 | Hoag et al. | ..................... 225/93 |
| 5,974,663 A | * | 11/1999 | Ikeda et al. | ............... 29/888.09 |
| 6,312,159 B1 | * | 11/2001 | Ishida et al. | ................. 384/294 |
| 6,427,326 B1 | * | 8/2002 | Soga et al. | ............. 29/888.092 |
| 6,474,526 B1 | * | 11/2002 | Hahnel et al. | ................ 225/100 |
| 6,817,505 B2 | * | 11/2004 | Hahnel et al. | ................... 225/2 |
| 6,961,997 B2 | * | 11/2005 | Kubota et al. | ............ 29/888.09 |
| 7,299,716 B2 | * | 11/2007 | Nakajima et al. | ............. 74/593 |

FOREIGN PATENT DOCUMENTS

| | | |
|---|---|---|
| JP | 2-19328 A | 1/1990 |
| JP | 2000-179535 A | 6/2000 |

* cited by examiner

*Primary Examiner*—David P Bryant
*Assistant Examiner*—Ryan J Walters
(74) *Attorney, Agent, or Firm*—Birch, Stewart, Kolasch & Birch, LLP

(57) ABSTRACT

To manufacture a connecting rod including positioning grooves having a function of positioning a bearing metal at low cost. A big end part of a split type connecting rod is fractured in two after inserting an approximately cylindrical die into a bearing hole. The die has projections corresponding to locking grooves on an outer circumferential surface thereof. The die includes a pair of split dies having tapered faces, each expanding an opening on an edge of an end face of each of the split die halves. The tapered faces are formed by partially notching mating surfaces by pressing the inner circumferential surface of the bearing hole with the projections by a movement of the pair of split dies in a radial direction of the bearing hole.

20 Claims, 8 Drawing Sheets

METHOD OF MANUFACTURING CONNECTING ROD

CROSS-REFERENCE TO RELATED APPLICATIONS

This nonprovisional application claims priority under 35 U.S.C. § 119(a) on Patent Application No. 2005-117820, filed in Japan on Apr. 15, 2005, the entirety of which is incorporated herein by reference.

BACKGROUND OF THE INVENTION

1. Field of the Invention

The present invention relates to a method of manufacturing a connecting rod. More particularly, the present invention relates to a method of manufacturing a connecting rod, which achieves a reduction in manufacturing costs, an improvement in positioning accuracy for a bearing metal, and the like.

2. Description of Background Art

In the background art, a bearing metal is inserted into a bearing hole in a big end part of a split type connecting rod (which includes a rod side upper half, on which a piston is provided, and a cap side lower half, which is fastened onto the rod side upper half) of an internal combustion engine (engine) used for a vehicle and the like. Specifically, the bearing metal is formed of a pair of bearing metal halves, each of which has a semi-arc-shaped cross section and is made of soft metal such as aluminum and brass. Moreover, lubricating oil circulating inside the engine forms an oil film between the bearing metal and a crank pin. Thus, lubrication between the connecting rod and the crank pin is achieved when the engine is operating.

In general, the pair of bearing metal halves as described above are positioned so as not to move in a circumferential direction and in an axial direction and are attached to the rod side upper half and the cap side lower half, respectively, on the big end part of the split type connecting rod.

In Japanese Examined Patent Publication No. Hei 2 1990-19328 and Japanese Patent Laid-Open No. 2000-17953, a projection that projects radially outward is formed on an end on either side in a circumferential direction of each bearing metal half having a semi-arc-shaped cross section. Moreover, a locking groove is formed on a mating surface side of an inner circumferential surface of each of upper and lower halves of a big end part of a split type connecting rod. Accordingly, positioning of the bearing metal halves inserted into a bearing hole of the big end part is performed by engagement between the projection and the locking groove on the connecting rod side.

A method of manufacturing a split type connecting rod is classified roughly into a separate-split type connecting rod and a fracture-split type connecting rod. Specifically, the separate-split type connecting rod is used by separately forming a rod side upper half and a cap side lower half of a big end part of a connecting rod and bonding both halves together. The fracture-split type connecting rod is used by integrally die-forming a whole connecting rod including a rod side upper half and a cap side lower half, fracturing the connecting rod into two parts including a rod side half including an upper half of a big end part and a cap side half that is the same as a lower half of the big end part after the die-forming, and assembling both halves so as to attach fracture surfaces to each other.

Among those described above, as to the separate-split type connecting rod, locking grooves formed on an inner circumferential surface of each of upper and lower halves of the big end part of the connecting rod are formed by cutting each of the halves. Thus, costs for manufacturing the separate-type connecting rod are generally increased. In the case of manufacturing by fracture-splitting, it is required to perform cutting to form a bearing hole so as to allow bottoms of the locking grooves and bottoms of the V-shaped grooves to be on the same plane, in order to form one continuous fracture surface after fracture. Moreover, if it is tried to perform cutting finish for the locking grooves in a state where an integrally formed material of the split type connecting rod is fractured into two halves at a position of the V-shaped groove and, thereafter, the two halves are attached to each other and assembled on the fracture surface, it is impossible to perform cutting to form the locking grooves so as to be located at different positions with each other in an axial direction of a bearing hole across the fracture surface. Thus, only a pair of locking grooves that face each other across the fracture surface and communicate with each other can be formed by cutting.

Consequently, without adopting a method of performing cutting to form the locking grooves located at axially different positions across the fracture surface, a method of integrally forming locking grooves by die-pressing while applying a compressive load in the axial direction of the big end part of the connecting rod may be adopted. However, when the connecting rod is formed by applying the compressive load in the axial direction of the big end part, only a locking groove opened in an end face in the axial direction of the big end part can be formed. Thus, in order to axially position the bearing metal inserted into the bearing hole of the big end part, it is required to provide locking grooves at two spots (on one end face in the axial direction of the big end part and the other end face thereof). Thus, it is required to similarly form projections of the respective bearing metal halves, which are engaged with the locking grooves, at two spots. Accordingly, costs for processing the bearing metal are increased.

SUMMARY OF THE INVENTION

In consideration of the problems described above, it is an object of the present invention to provide a method of manufacturing a connecting rod, which reduces costs for manufacturing locking grooves engaged with projections of a bearing metal and improves a function of positioning the bearing metal.

In order to achieve the foregoing object, a method of manufacturing a connecting rod according to the present invention is a method of manufacturing a connecting rod including a big end part which supports a crankshaft with a bearing, a small end part which supports a piston pin with a bearing, and a rod part which integrally connects the big end part to the small end part. The big end part is split in two by fracture on a split surface which passes an approximately central axis of a bearing hole formed in the big end part with an approximately circular cross section and which is approximately perpendicular to a center line connecting the big end part to the small end part and dividing the rod part into right and left sides. The big end part is split into a rod side upper half obtained by integrating an upper half of the big end part with the small end part by use of the rod part and a cap side lower half formed of a lower half of the big end part. The connecting rod is used in a state where the rod side upper half and the cap side lower half are bonded on the split surface in a state where a bearing metal having an arc-shaped cross section is attached to an inner circumferential surface of the bearing hole. Furthermore, the connecting rod has positioning grooves (for example, locking grooves 5a and 5b in an embodiment) for fixing the bearing metal on the inner circumferential surface of the bearing hole. The method includes the steps of: inserting an approximately cylindrical die into the bearing hole, the die having projections corresponding to the positioning grooves on an outer circumferential surface and including a pair of split dies in which at least one of mating surfaces is partially notched to form a tapered face extended wider toward an end face of one end of the split die; pressing the inner circumferential surface of the bearing hole with the projections by sliding a tapered wedge along the tapered face and moving the pair of split dies in a radial direction of the bearing hole while separating the mating surfaces from each other; and forming the positioning grooves on the inner circumferential surface of the bearing hole. All of these steps are carried out before fracturing the big end part.

Moreover, in the method of manufacturing a connecting rod having the configuration described above, it is preferable that convex parts for forming fracture grooves for facilitating fracture of the big end part on the inner circumferential surface of the bearing hole are provided on the outer circumferential surface of the die, while being extended in the axial direction of the die. When the inner circumferential surface of the bearing hole is pressed, the positioning grooves are formed and the fracture grooves are formed in the axial direction on the inner circumferential surface of the bearing hole.

According to the method of manufacturing a connecting rod according to the present invention, the big end part is split in two by fracture after integrally die-forming the entire connecting rod, unlike the manufacturing method by which the rod side upper half and the cap side lower half of the big end part of the connecting rod are formed as separate bodies. Thus, it is possible to omit a step of cutting the big end part. Moreover, in the manufacturing method by which the big end part is split in two by fracture, if the rod side upper half and the cap side lower half are bonded so as to attach fracture surfaces thereof to each other, both halves can be bonded to fit perfectly to each other without misalignment. Thus, it is not required to cut mating surfaces to form positioning holes or projections. Moreover, drilling of bolt holes for bonding both halves, which has been required for each of the rod side upper half and the cap side lower half, may be performed once before fracture-splitting. As described above, various machining steps can be omitted. Thus, the connecting rod can be manufactured at a low cost.

In addition to the effect as described above, in the manufacturing method according to the present invention, before fracture of the big end part, positioning grooves for fixing the bearing metal are formed by pressing the bearing hole in the big end part by use of the die having projections corresponding to the positioning grooves. Thus, it is not required to form the positioning grooves by cutting. From this viewpoint, the connecting rod can be manufactured at low cost.

In addition, in the manufacturing method according to the present invention, unlike a manufacturing method such as die-pressing by applying a compressive load in the axial direction of the bearing hole, the positioning grooves are formed by pressing the inner circumferential surface of the bearing hole in the radial direction. Thus, without being limited to formation of positioning grooves opened in an end face in the axial direction of the bearing hole, the positioning grooves can be formed at arbitrary positions in the axial direction of the bearing hole according to positions of the projections on the die. As described above, when the projections of the bearing metal are fixed to positioning grooves not opened in the end face in the axial direction of the bearing hole, the projections come into contact with both wall surfaces of the positioning grooves in the axial direction of the bearing hole. Accordingly, the projections are firmly fixed in the axial direction, and movement thereof in the axial direction is restricted. Thus, it is only necessary to form one positioning groove for fixing the bearing metal (halves) in the axial direction.

Since it is only necessary to form one positioning groove for fixing the bearing metal in the axial direction as described above, it is only necessary to form one projection corresponding thereto, which is provided on the bearing metal to be fixed to the positioning groove on the bearing hole. Thus, it is possible to reduce manufacturing costs for performing cutting to form the projections on the bearing metal.

Furthermore, when the positioning grooves can be formed at arbitrary positions in the axial direction of the bearing hole according to the positions of the projections on the die and a pair of bearing metal halves having an approximately arc-shaped cross section are attached so as to face each other in the bearing hole, when the pair of bearing metal halves are inserted into the bearing hole, end faces of the respective projections formed on the pair of bearing metal halves butt a fracture surface of the big end part. Thus, compared with the case where a pair of positioning grooves facing each other across the fracture surface and communicating with each other are formed, a positioning function for the bearing metal halves in the circumferential direction by the positioning grooves is sufficiently achieved.

In addition, if the peripheral part of the die is configured so as to form notched fracture grooves, of which bottoms are on the same plane as bottoms of the positioning grooves, together with the positioning grooves on the inner circumferential surface of the bearing hole (if positions of the projections and the convex parts are aligned), the fracture grooves are set to be starting points of fracture when the big end part is fracture-split and fracture is facilitated. Moreover, one continuous fracture surface is likely to be formed at the time of fracture.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 (*a*) is a side view and FIG. 3 (*b*) is a bottom view showing an upper bearing metal half attached to the big end part of the split type connecting rod shown in FIG. 1;

FIG. 4 (*a*) is a top plan view and FIG. 4 (*b*) is a side view showing a lower bearing metal half attached to the big end part of the split type connecting rod shown in FIG. 1;

FIG. 6 (a) is a plan view and FIG. 6 (b) is a side view showing a die for forming positioning grooves and the like to fix the bearing metal halves to the big end part of the split type connecting rod;

FIGS. 8 (a) and 8 (b) are views showing the steps of forming the positioning grooves and the like by use of the die, wherein FIG. 8 (a) shows a state before the positioning grooves and the like are formed in the big end part and FIG. 8 (b) shows a state after the positioning grooves and the like are formed in the big end part.

DETAILED DESCRIPTION OF THE PREFERRED EMBODIMENTS

The present invention will now be described with reference to the accompanying drawings, wherein the same or similar elements will be identified with the same reference numerals.

Figure 1:
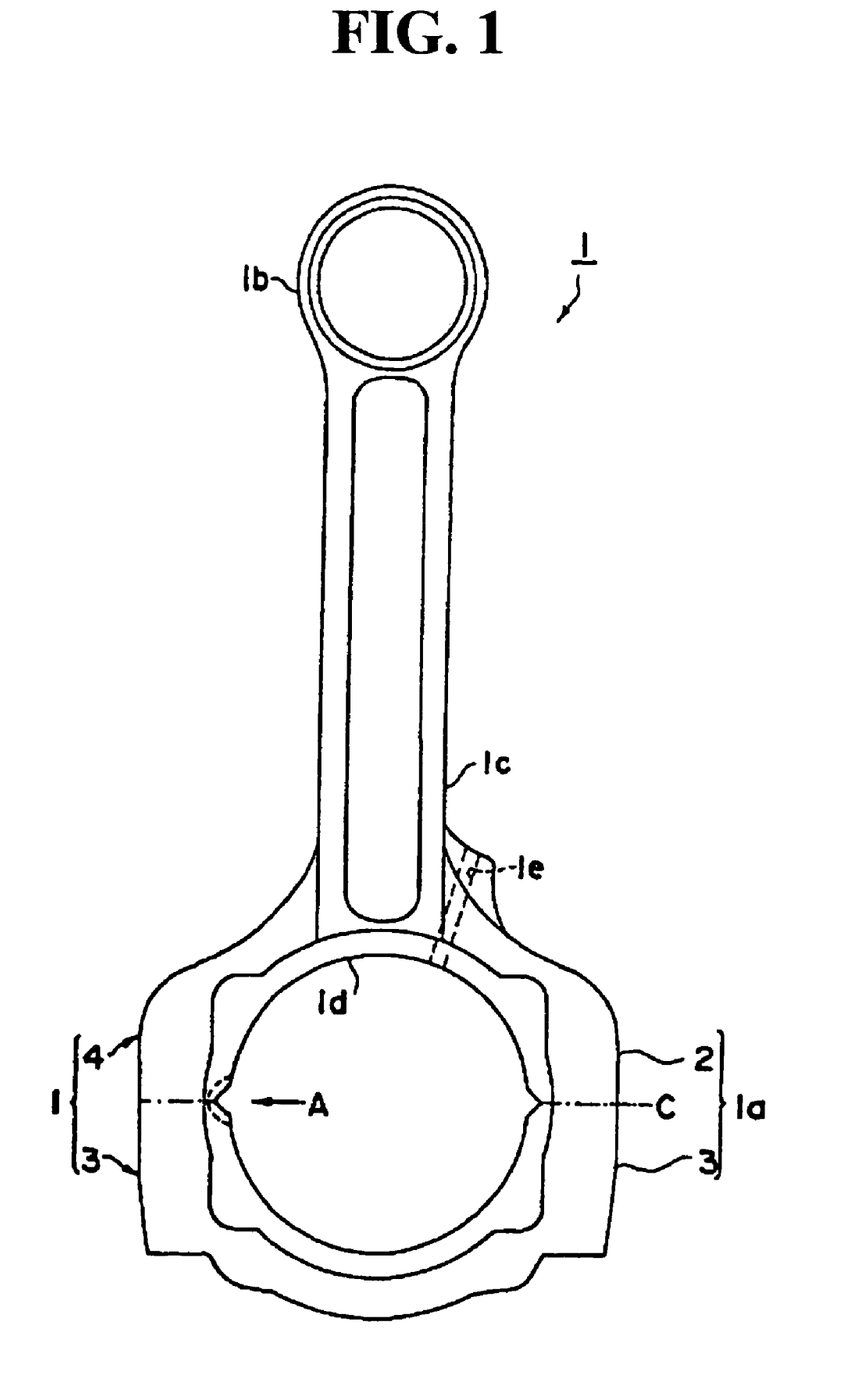
FIG. 1 is a front view of a split type connecting rod according to the present invention.
Figure 2:
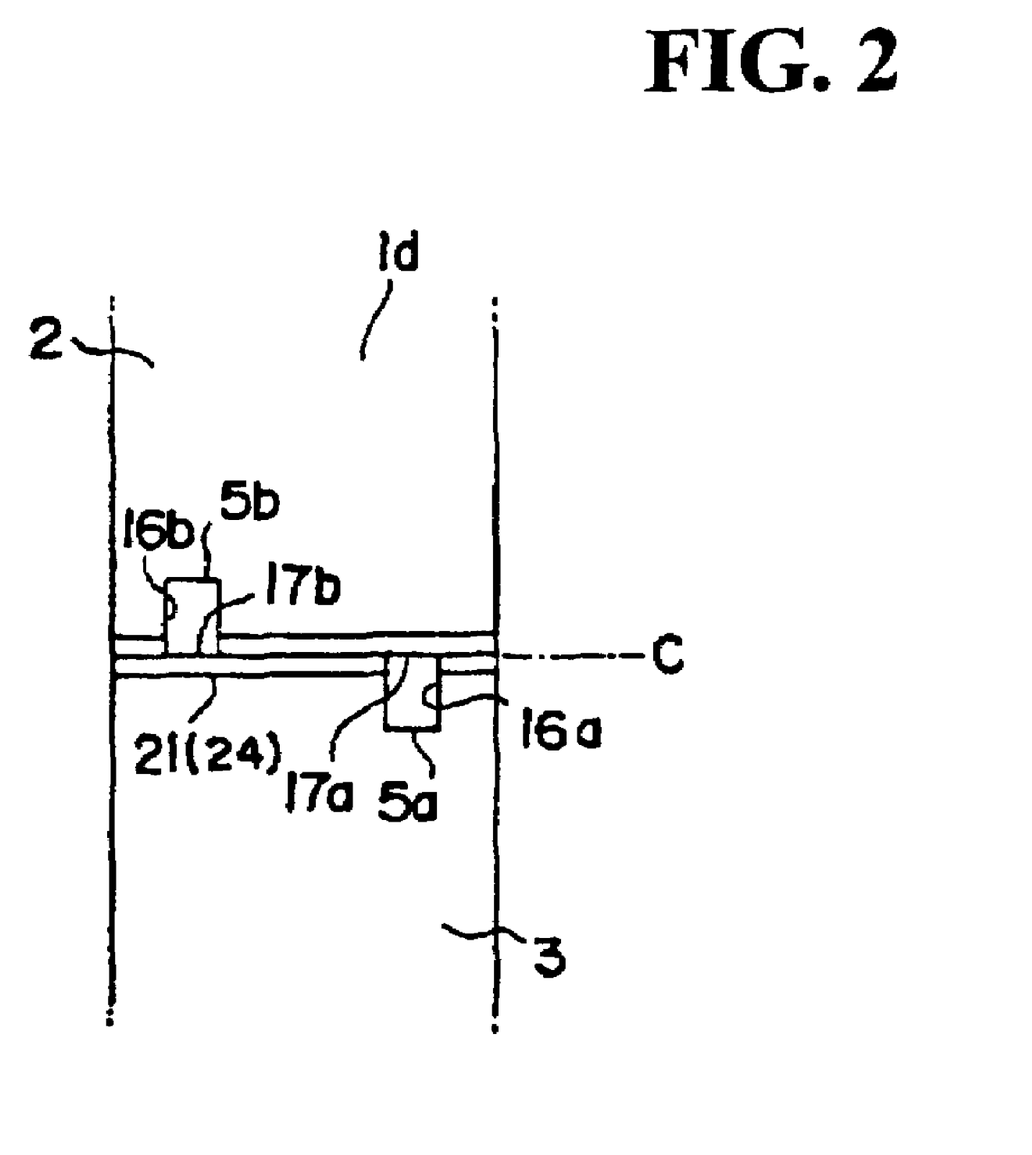
FIG. 2 is a schematic front view showing an inner circumferential surface of a big end part of the split type connecting rod, when viewed from a direction A in FIG. 1.
Figure 3A:
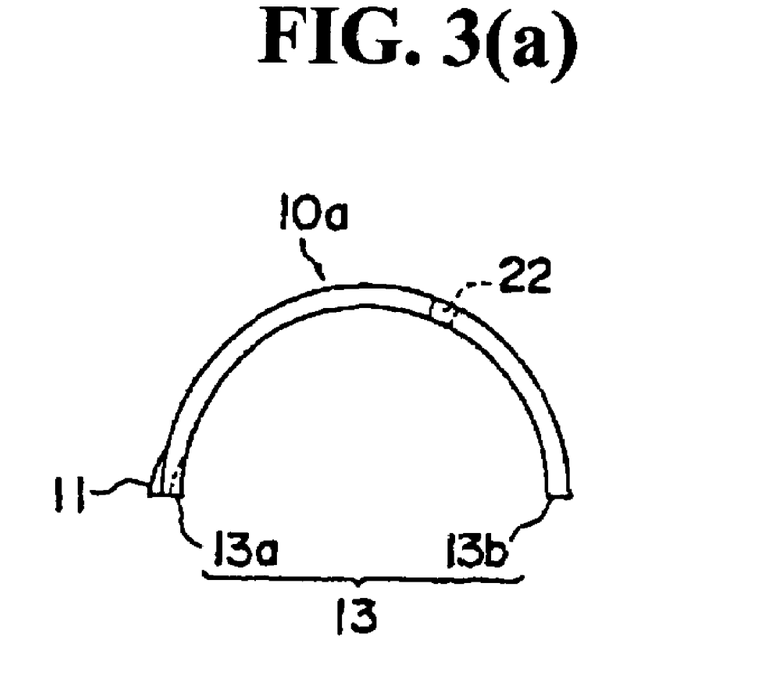
Figure 3B:
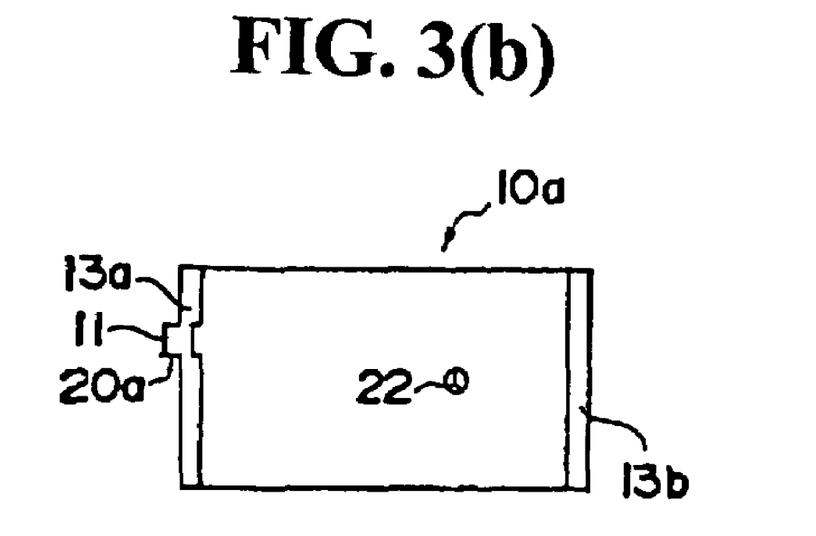
Figure 4A:
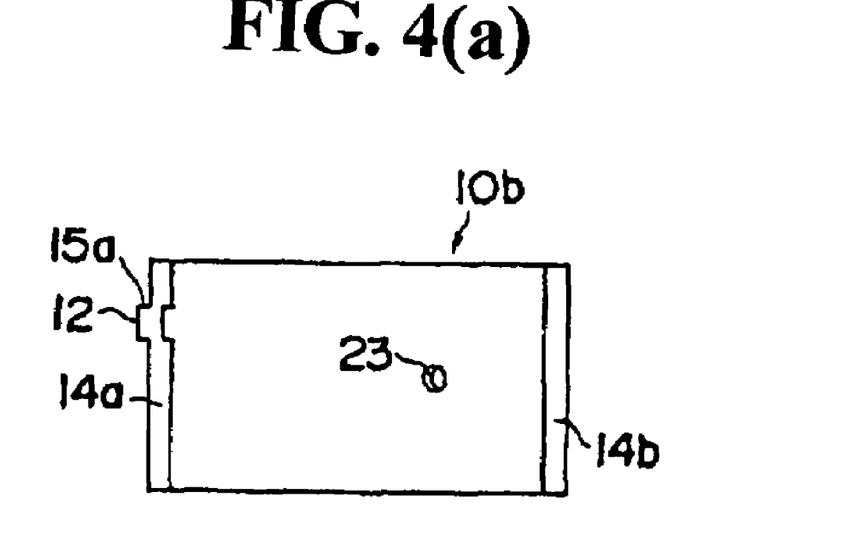
Figure 4B:
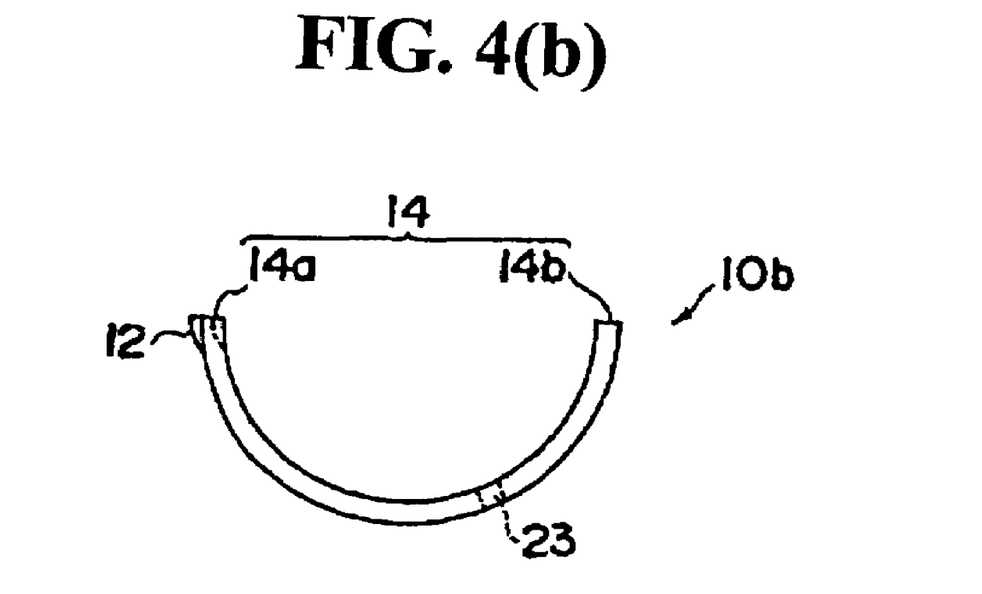
Figure 5:
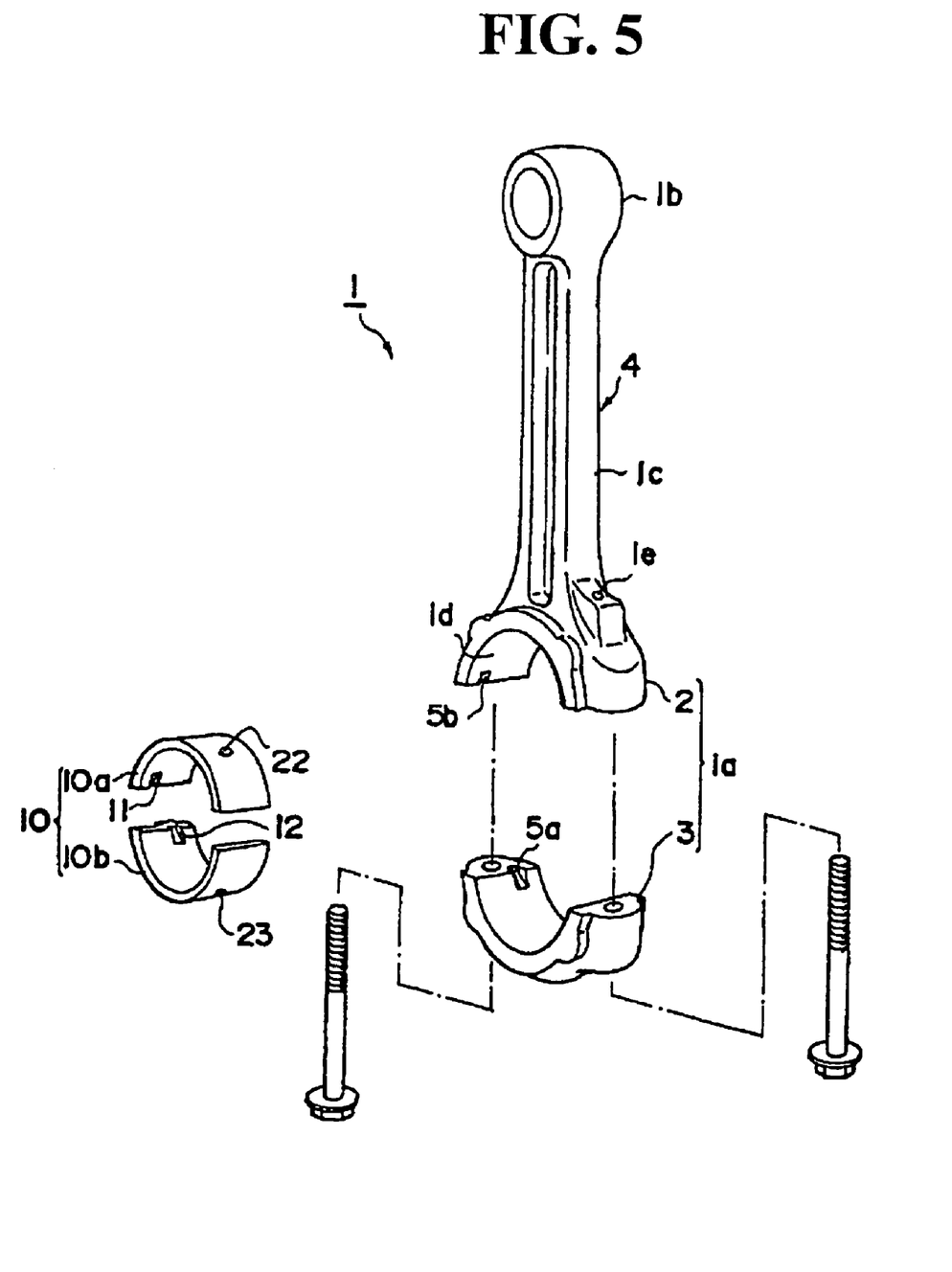
FIG. 5 is an exploded perspective view showing the split type connecting rod shown in FIG. 1 and a bearing metal attached to the big end part thereof.
Figure 6A:
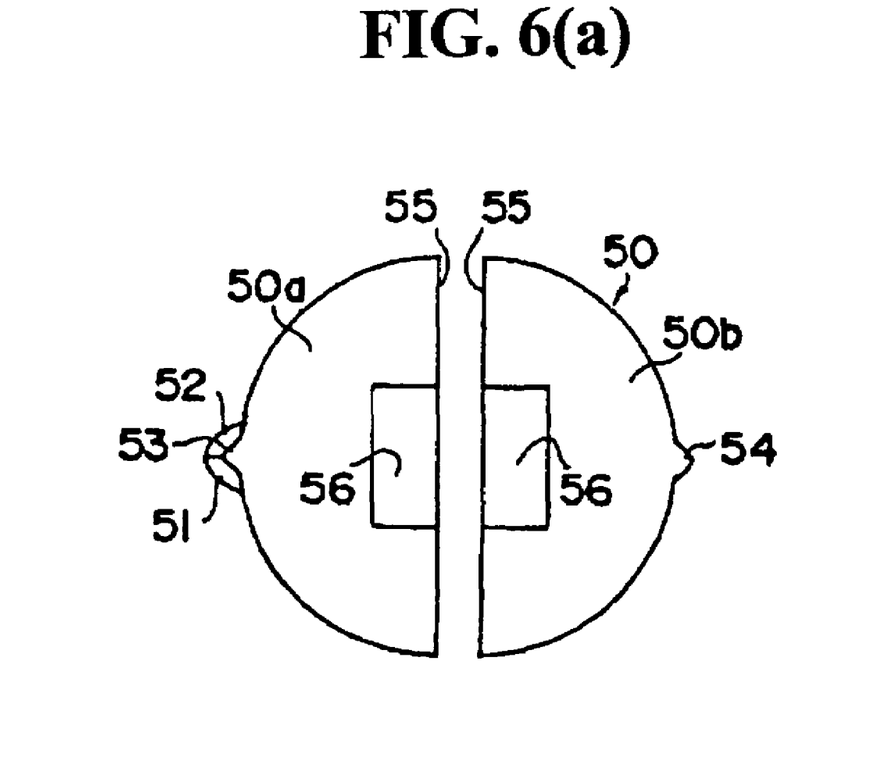
Figure 6B:
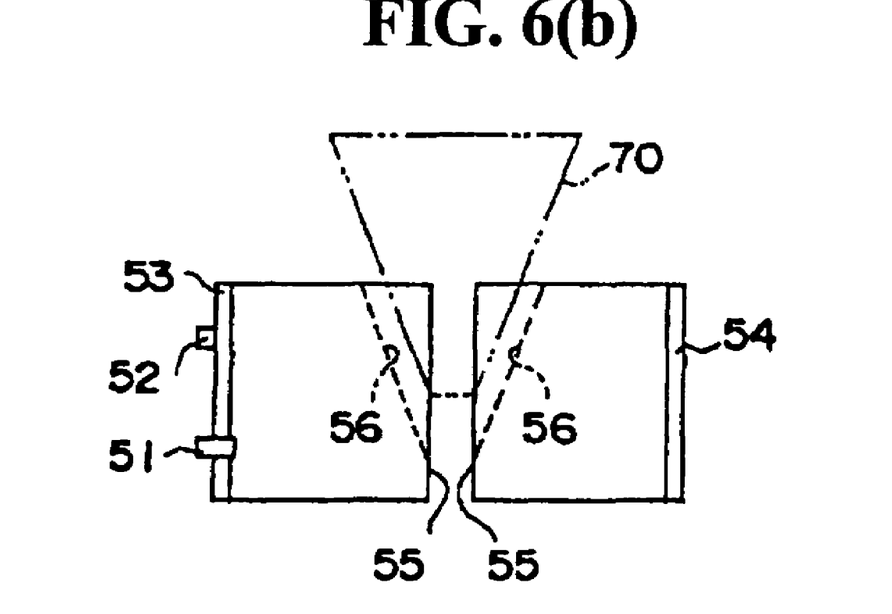
Figure 7:
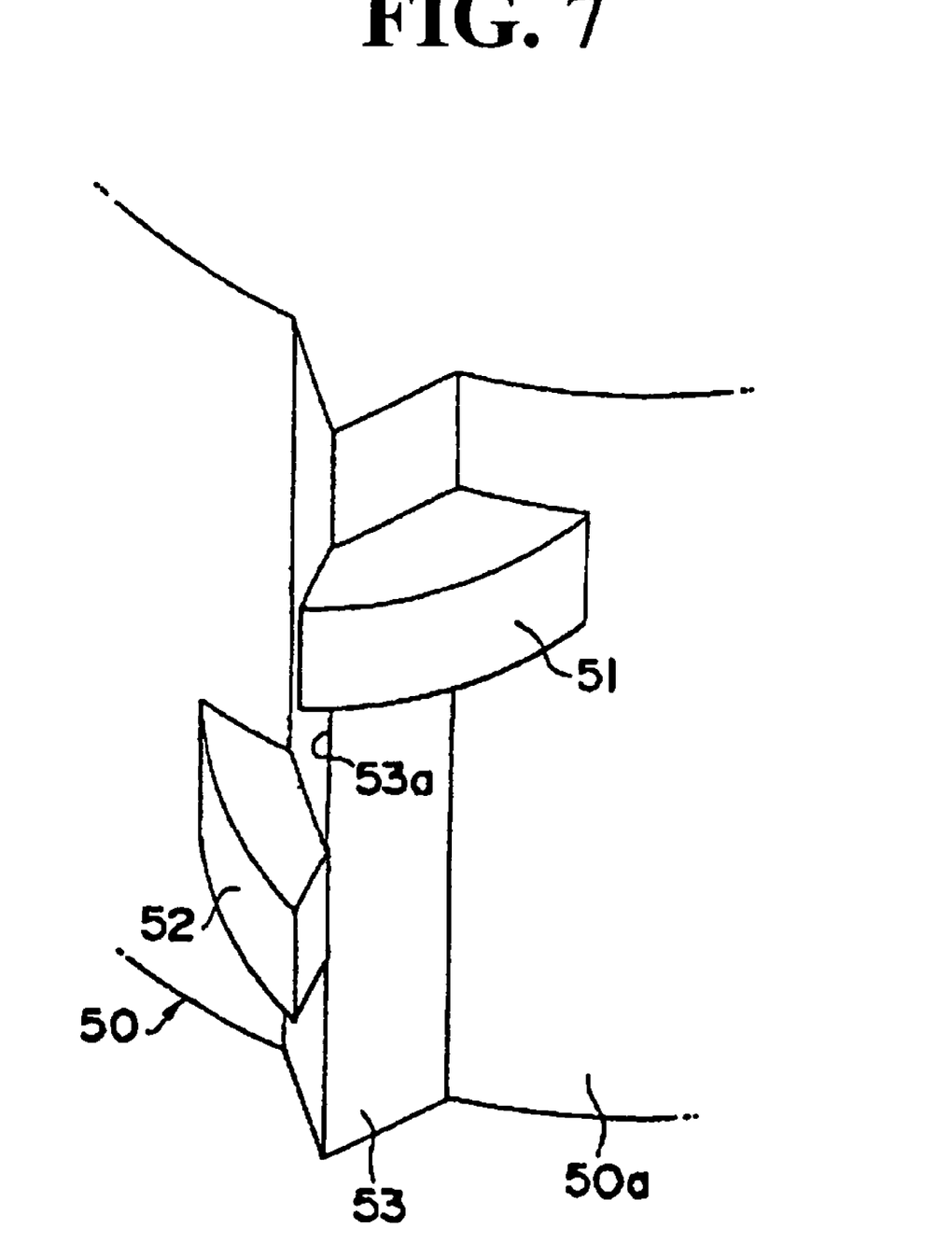
FIG. 7 is a partial perspective view showing a portion around a projections on the die.
Figure 8A:
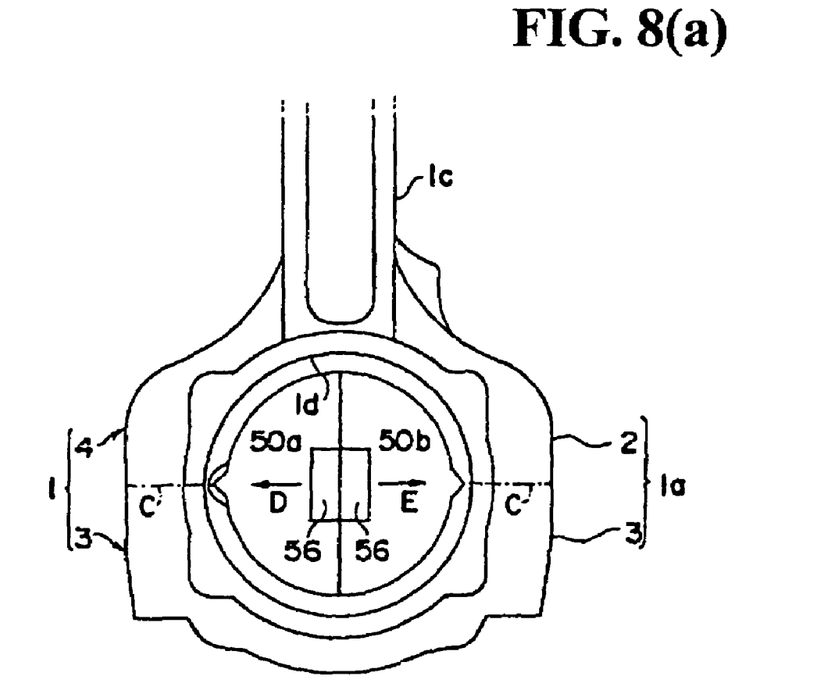
Figure 8B:
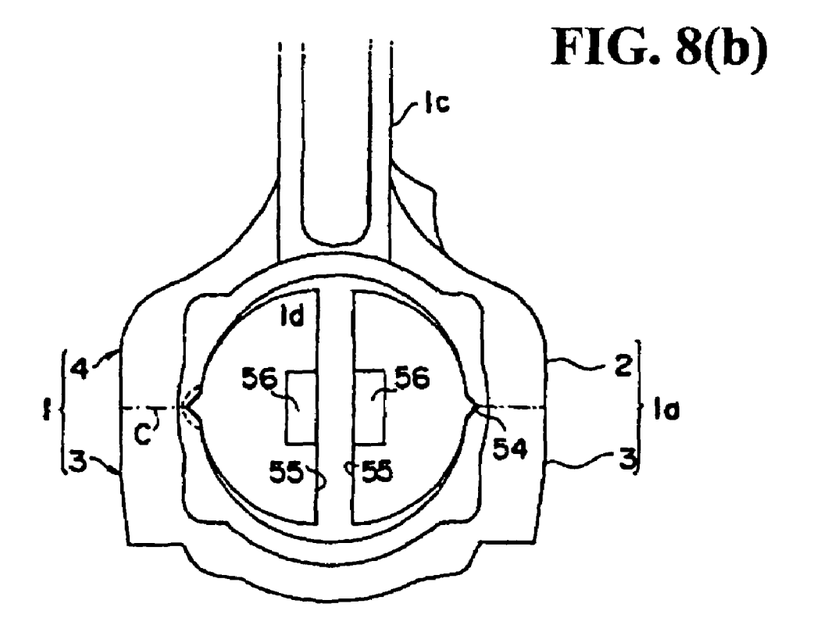

With reference to FIGS. 1 to 8, an embodiment of the present invention will be described below. First, with reference to FIGS. 1 to 5, description will be given of a structure of a connecting rod manufactured by use of a method of manufacturing a connecting rod according to the present invention. FIG. 1 is a front view of a split type connecting rod according to the present invention. FIG. 2 is a schematic front view showing an inner circumferential surface of a big end part of the split type connecting rod, when viewed from a direction A in FIG. 1. FIG. 3 (a) is a side view and FIG. 3 (b) is a bottom view showing an upper bearing metal half attached to the big end part of the split type connecting rod shown in FIG. 1. FIG. 4 (a) is a top plan view and FIG. 4 (b) is a side view showing a lower bearing metal half attached to the big end part of the split type connecting rod shown in FIG. 1. FIG. 5 is an exploded perspective view showing the split type connecting rod shown in FIG. 1 and a bearing metal attached to the big end part thereof. Moreover, FIG. 6 (a) is a plan view and FIG. 6 (b) is a side view showing a die for forming positioning grooves and the like to fix the bearing metal halves to the big end part of the split type connecting rod. FIG. 7 is a partial perspective view of the die. FIGS. 8 (a) and 8 (b) are views showing the steps of forming the positioning grooves and the like by use of the die. Specifically, FIG. 8 (a) shows a state before the positioning grooves and the like are formed in the big end part, and FIG. 8 (b) shows a state after the positioning grooves and the like are formed in the big end part.

As shown in FIG. 1, a split type connecting rod 1 includes: a big end part 1a which holds a crank pin of an unillustrated crankshaft; a small end part 1b which holds a piston pin of an unillustrated piston; and a rod part (shaft part) 1c which connects the big end part 1a to the small end part 1b.

The split type connecting rod 1 is manufactured in the following manner. Specifically, the split type connecting rod 1 is split in two on a split surface C which passes an approximately central axis of a crank pin bearing hole 1d in the big end part 1a and which is perpendicular to a center line of the split type connecting rod 1. The center line extends from the big end part 1a to the small end part 1b and divides the rod part 1c into right and left sides. Accordingly, a rod side half 4 and a cap side half 3 are prepared. Specifically, the rod side half 4 is formed by integrating an upper half (rod side upper half) 2 of the big end part 1a, the small end part 1b and the rod part 1c. Thus, both halves 4 and 3 are bonded on the split surface C and integrated. The cap side half 3 and a lower half (cap side lower half) 3 of the big end part 1a are the same body.

There is also a separate-split type connecting rod in which the rod side half 4 and the cap side half 3 are die-formed as separate bodies from the beginning. The connecting rod according to the present invention is a fracture-split type connecting rod manufactured by integrally die-forming the rod side half 4 and the cap side half 3. Thereafter, the integrally die-formed body is fractured and split into two separate bodies. Therefore, the split surface C is a fracture surface C formed by the fracture described above.

In the split type connecting rod 1 that is fractured and split into the rod side half 4 and the cap side half 3, an inner circumferential surface of the big end part 1a is finished by machining such as cutting when both halves are assembled. Thus, the bearing hole 1d is formed.

In the upper half 2 of the big end part 1a of the split type connecting rod 1, a lubricating oil passage 1e having an opening in the inner circumferential surface of the big end part 1a is formed at a position that avoids a connection part between the big end part 1a and the rod part 1c which connects the big end part 1a to the small end part 1b.

A relatively soft metal such as brass and aluminum alloy is used as a material of a bearing metal 10. As shown in FIG. 5, the bearing metal 10 is formed of a pair of upper and lower bearing metal halves 10a and 10b, each of which has a semi-arc-shaped cross section. As shown in FIGS. 3 and 4, on mating surfaces 13 and 14 of the upper and lower bearing metal halves 10a and 10b, which are used to butt the upper and lower bearing metal halves 10a and 10b with each other into a cylindrical shape, projections 11 and 12 that project radially outward are formed by press working, respectively.

The mating surfaces 13 and 14 of the upper and lower bearing metal halves 10a and 10b include mating surface portions 13a and 13b and mating surface portions 14a and 14b on both ends in a circumferential direction of the upper and lower bearing metal halves 10a and 10b, respectively. The projection 11 is formed on the mating surface portion 13a, and the projection 12 is formed on the mating surface portion 14a. Specifically, the projections 11 and 12 are formed at axially different positions with each other.

On a peripheral wall of the upper bearing metal half 10a, an oil hole 22 is formed at a position corresponding to the opening of the oil passage 1e formed in the upper half 2 of the big end part 1a of the split type connecting rod 1. An oil hole 23 is formed on a peripheral wall of the lower bearing metal half 10b at a position facing the oil hole 22 across the mating surfaces of both bearing metal halves 10a and 10b.

The upper and lower bearing metal halves 10a and 10b described above are attached to the upper and lower halves 2 and 3 of the big end part 1a of the fracture-split type connecting rod 1, respectively, in the following manner.

In an upper half 2 side portion and a lower half 3 side portion of the bearing hole 1d that is the inner circumferential surface of the big end part 1a of the fracture-split type connecting rod 1, a pair of locking grooves 5a and 5b are formed. The locking grooves 5a and 5b are located at positions different from each other in the axial direction of the big end part 1a as shown in FIG. 2, when viewed from a direction of the arrow A in FIG. 1, below and above the fracture surface C, respectively. The locking grooves 5a and 5b described above are formed by cold forging using a die 50 as described later.

When the upper and lower bearing metal halves 10a and 10b are attached to the big end part 1a, the projection 11 is engaged with the locking groove 5a and the projection 12 is engaged with the locking groove 5b respectively. Thus, movement of the upper and lower bearing metal halves 10a and 10b in the circumferential direction and in the axial direction is restricted.

In the case of the upper and lower bearing metal halves 10a and 10b shown in FIGS. 3 and 4, when the upper bearing metal half 10a is attached to the upper half 2 of the big end part 1a, the projection 11 of the upper bearing metal half 10a is engaged with the locking groove 5b of the upper half 2. Moreover, when the lower bearing metal half 10b is attached to the lower half 3 of the big end part 1a, the projection 12 of the lower bearing metal half 10b is engaged with the locking groove 5a of the lower half 3.

For example, when the lower bearing metal half 10b is attached to the lower half 3 of the big end part 1a, in engagement between the projection 12 and the locking groove 5a, a locking surface 15a of the projection 12 is engaged with a locking surface 16a of the locking groove 5a. Moreover, a ceiling surface of the projection 12 is engaged with a locking surface 17a of the locking groove 5a. Note that the locking surface 17a is on the mating surface of the upper half 2 in the position of the fracture surface C.

Accordingly, movement of the lower bearing metal half 10b in the axial direction is restricted by the engagement between the locking surface 15a and the locking surface 16a. Moreover, by the engagement between the ceiling surface of the projection 12 and the locking surface 17a, the lower bearing metal half 10b is positioned in the circumferential direction and movement of the lower bearing metal half 10b in the circumferential direction is restricted.

Similarly, when the upper bearing metal half 10a is attached to the upper half 2 of the big end part 1a, movement of the upper bearing metal half 10a in the axial direction is restricted by engagement between a locking surface 20a of the projection 11 and a locking surface 16b of the locking groove 5b. Moreover, by engagement between a bottom surface of the projection 11 and a locking surface 17b of the locking groove 5b, the upper bearing metal half 10a is positioned in the circumferential direction and movement of the upper bearing metal half in the circumferential direction is restricted. Note that the locking surface 17b is on the mating surface of the lower half 3 in the position of the fracture surface C.

As described above, the upper and lower bearing metal halves 10a and 10b are respectively attached to the upper and lower halves 2 and 3 of the big end part 1a of the fracture-split type connecting rod 1 in a state where movement thereof in the circumferential direction and in the axial direction is restricted.

As shown in FIG. 2, on the inner circumferential surface (the bearing hole 1d) of the big end part 1a of the fracture-split type connecting rod 1, a concave groove 21 having a notch part that is a starting point of fracture is formed along the fracture surface C. The concave groove 21 has a V-shaped cross section and a bottom of the V shape forms the notch part. The concave groove 21 is die-formed together with the locking grooves 5a and 5b during the cold forging using the die 50 as described later. A formation position of the concave groove 21 is where the big end part 1a is fractured on the fracture surface C.

The concave groove 21 formed as described above facilitates a fracture operation during fracture of an integrally formed material of the fracture-split type connecting rod 1. The concave groove 21 also serves to chamfer the respective mating surfaces of the upper and lower halves 2 and 3 of the big end part 1a of the fracture-split type connecting rod 1.

Furthermore, on the inner circumferential surface (the bearing hole 1d) of the big end part 1a of the fracture-split type connecting rod 1, a concave groove 24 that has a notch part as a starting point of fracture is also formed along the fracture surface C so as to face the concave groove 21. The concave groove 24 is also formed at the position where the big end part 1a is cut on the fracture surface C, and is die-formed during the cold forging using the die 50.

With reference to FIGS. 6 and 7, description will be given of the die 50 for forming the locking grooves 5a and 5b formed on the inner circumferential surface of the bearing hole 1d of the big end part 1a. The die 50 is formed of a pair of split die halves 50a and 50b. When the pair of split die halves 50a and 50b are attached to each other on mating surfaces 55 and 55 thereof, an approximately cylindrical shape is formed as a whole. Tapered faces 56 and 56 are formed on the mating surfaces 55 and 55 of the split die halves 50a and 50b. Each of the tapered faces 56 and 56 is formed by partially notching each of the mating surfaces and expanding an opening on an edge of an end face of each of the split die halves 50a and 50b.

Note that an alloy tool steel for a cold die can be used as a material of the die 50. For example, it is preferable to use one employed for a press die, such as SKS 31 containing tungsten or SKD 12 that is high-carbon high-Cr steel.

On an outer circumferential surface of the split die half 50a, a convex part 53 is formed so as to extend in the axial direction of the die 50. Specifically, the convex part 53 has a V-shaped cross section and corresponds to the concave groove 21 on the inner circumferential surface of the bearing hole 1d of the big end part 1a. Similarly, on an outer circumferential surface of the other split die half 50b, a convex part 54 is formed so as to extend in the axial direction of the die 50. Specifically, the convex part 54 has a V-shaped cross section and corresponds to the concave groove 24 on the inner circumferential surface of the bearing hole 1d of the big end part 1a.

On the outer circumference of the split die half 50a, projections 51 and 52 corresponding to the locking grooves 5a and 5b on the inner circumferential surface of the bearing hole 1d of the big end part 1a are formed across the convex part 53 while projecting outward in a radial direction of the die 50. The projections 51 and 52 are not located at positions facing each other across the convex part 53 but are located at positions shifted from each other in the axial direction of the die 50.

With reference to FIGS. 8 (a) and 8 (b), the steps of a method of manufacturing a split type connecting rod configured as described above will be sequentially described.

As a material of the split type connecting rod 1, alloy steel for machine structural use is used, which contains a relatively low concentration of carbon by a mass ratio of about 0.13 to 0.23%. Compared with carbon steel, such alloy steel can have a sufficient hardness even if a member with a diameter of about 15 mm or more is used. Since the alloy steel described above contains a relatively low concentration of carbon, a hardness thereof at room temperature is lower than that of high-carbon alloy steel. Moreover, mechanical properties thereof are suitable for cold forging to be performed later.

Cr—Mo steel (for example, one having a mass ratio of C: 0.13 to 0.18%, Mn: 0.60 to 0.85%, Cr: 0.90 to 1.20%, Mo: 0.15 to 0.30%, Si: 0.15 to 0.35%, P: 0.03% or less and S: 0.03% or less) or Cr steel (for example, one having a mass ratio of C: 0.13 to 0.18%, Mn: 0.60 to 0.85%, Cr: 0.90 to 1.20%, Si: 0.15 to 0.35%, P: 0.03% or less and S: 0.03% or less) is selected. Note, however, that the compositions described above are merely examples. The material of the split type connecting rod 1 does not necessarily have such a composition as long as alloy steel for machine structural use is used.

First, a round bar made of a material having a composition as described above is subjected to volume distribution (rough forming) by roll forging or the like. The material is put between dies carved into a shape of a product and is hot-forged by heating to a recrystallization temperature or more. The material formed by hot forging has a rough shape of the product with a burr around it. Thereafter, the burr produced around the shape of the product in the hot forging step is removed by pressing. Furthermore, an end mill is used to cut a surface of the material including a portion to be a bearing hole 1d of a big end part 1a.

Next, by use of a die 50 as described above, cold-forging is performed to form locking grooves 5a and 5b and concave grooves 21 and 24 in the portion that is to be the bearing hole 1d of the big end part 1a.

The cold forging is performed by inserting the die 50, which is obtained by putting together split die halves 50a and 50b on mating surfaces 55 and 55, into the bearing hole 1d of the big end part 1a (see FIG. 8 (a)). In the above state, a tapered wedge 70 is inserted from its tip side so as to follow tapered faces 56 and 56 of the die 50 (see FIG. 6 (b)).

Thereafter, by use of a fracturing machine as described later, which is used to fracture-split the big end part 1a in two, the wedge 70 is pressed downward in an axial direction of the die 50 by pressing an upper surface of the wedge 70. In this event, a peripheral side face of the big end part 1a is firmly fixed so as not to move the big end part 1a, which diverts the applied force to the die 50 from the wedge 70.

Along with movement of the wedge 70 downward in the axial direction of the die 50, the wedge 70 slides along the tapered faces 56 and 56 of the die 50. In this event, a component of force applied to the die 50 from the wedge 70 in a radial direction of the die 50 presses the die 50 in the radial direction. Accordingly, the split die half 50a on the left side in the plan view direction is moved to the left (in a direction of the arrow D) in FIG. 8 (a) and the split die half 50b on the right side is moved to the right (in a direction of the arrow E) similarly in FIG. 8 (a) (see FIG. 8 (b)). Specifically, along with the downward movement of the wedge 70, the left and right split die halves 50a and 50b put together on the mating surfaces 55 and 55 at the beginning are separated from each other. Along with the separation of the left and right split die halves 50a and 50b, an inner circumferential surface of the bearing hole 1d is pressed in a radial direction of the bearing hole 1d by the die 50.

To be more specific, the inner circumferential surface of the bearing hole 1d is pressed by projections 51 and 52 formed on an outer circumference of the die 50. Similarly, the inner circumferential surface of the bearing hole 1d is pressed by convex parts 53 and 54 formed on the outer circumference of the die 50.

The larger the distance between the left and right split die halves 50a and 50b is, the larger the force pressing the inner circumferential surface of the bearing hole 1d in the radial direction by the convex parts 53 and 54 and the projections 51 and 52 becomes. Accordingly, the inner circumferential surface of the bearing hole 1d undergoes plastic deformation so as to form concave parts. Thus, the locking grooves 5a and 5b and the concave grooves 21 and 24 are formed in the inner circumferential surface of the bearing hole 1d.

Next, heat treatment is performed for the material in which the locking grooves 5a and 5b and the concave grooves 21 and 24 are formed as described above. As the heat treatment step, first, a carburizing treatment is performed. Gas carburizing is used as the carburizing treatment, for example. In the gas carburizing, the material heated to an austenite range is exposed in hydrocarbon gas. Thus, a carbon concentration in a surface layer of the material is increased. Note that the carburizing treatment is not limited to gas carburizing, but may be pack carburizing or liquid carburizing.

After the carburizing treatment, a quenching treatment is performed with the material heated to the austenite range. By such quenching treatment after the carburizing, quench hardening occurs in the surface layer of the material, into which carbon has penetrated during the carburizing treatment. Thus, abrasion resistance and fatigue resistance are improved to make the material suitable to be used as a connecting rod.

The integrally formed material subjected to the heat treatment is set in the fracturing machine for fracture-splitting the material. In this step, an impact force is applied to the big end part 1a of the integrally formed material by the fracturing machine. Thus, the big end part 1a of the integrally formed material is fracture-split into a rod side half 4 and a cap side half 3.

By such fracture-splitting, the big end part 1a of the integrally formed material is split into the rod side half 4 and the cap side half 3. Thus, compared with a method of cutting the big end part 1a of the integrally formed material, the time required to split the big end part in two can be shortened. Moreover, when the two split members are assembled, both members can be attached to fit perfectly to each other without misalignment by attaching fracture surfaces thereof to each other.

If a peripheral part of the die 50 is configured so as to form bottoms of the locking grooves 5a and 5b and bottoms of the concave grooves 21 and 24 within the same plane on the inner circumferential surface of the bearing hole 1d by the cold forging (if the convex part 53 is formed so as to allow the both of projections 51 and 52 to come into contact with a pointed end 53a of the convex part 53), the bottoms of the locking grooves 5a and 5b and the bottoms of the concave grooves 21 and 24 are set as a starting point of fracture when the big end part 1a is fracture-split. Thus, fracturing the big end part 1a is facilitated. Moreover, during the fracture, one continuous fracture surface C is likely to be formed.

In the split type connecting rod 1 after the fracture-splitting, the rod side half 4 and the cap side half 3 of the big end part 1a are integrated again by attaching the fracture surfaces thereof to each other. Thereafter, in the state where the rod side half 4 and the cap side half 3 are assembled, the inner circumferential surface of the bearing hole 1d is subjected to a finishing process. In this finishing process, the inner circumferential surface of the bearing hole 1d is subjected to fine polishing using fine abrasive grains, for example a honing process. By such fine polishing, a surface having a surface roughness of 1 µm or less is obtained in the bearing hole 1d.

As described above, the split type connecting rod 1 having the big end part 1a subjected to the finishing process is provided as a product in the following manner. Specifically, in a state where the bearing metal halves 10a and 10b are inserted into the bearing hole 1d, the upper bearing metal half 10a is fixed to the locking groove 5b and the lower bearing metal half 10b is fixed to the locking groove 5b, the bearing metal halves 10a and 10b are elastically deformed so as to reduce a radius of curvature thereof. Thereafter, the rod side half 4 and the cap side half 3 are assembled by fastening with bolts.

By setting the projections 51 and 52 in the peripheral part of the die 50 to project outside of the die 50 by approximately the same length, the depths of the locking grooves 5a and 5b formed on the inner circumferential surface of the bearing hole 1d are set approximately the same. Thus, when the rod side half 4 and the cap side half 3 are fastened with bolts and the bearing metal halves 10a and 10b are fixed respectively, the bearing metal halves 10a and 10b are attached to each other on the mating surfaces 13a and 14a thereof without being radially shifted from each other. Accordingly, the bearing metal 10 is fixed to have an approximately cylindrical cross section. Therefore, when a crank pin is installed to the big end part 1a and lubricating oil is supplied between an outer circumferential surface of the crank pin and an inner circumferential surface of the bearing metal 10, the lubricating oil is distributed around the crank pin while evenly flowing therearound so as to make the gap between the outer circumferential surface of the crank pin and the inner circumferential surface of the bearing metal 10 uniform in the circumferential direction. Thus, a lubricating oil film is sufficiently secured.

Although the embodiment of the present invention has been described above, the scope of the present invention is not limited to the embodiment described above. In the embodiment described above, the two locking grooves 5a and 5b are formed on the inner circumferential surface of the bearing hole 1d by using the die 50 having a pair of projections 51 and 52 in the peripheral part. On the other hand, a locking groove is formed by cold forging using a die having one projection in its peripheral part. Thereafter, a bearing metal with a projection (the bearing metal not being one split into a pair of bearing metal halves but being one integrated) corresponding to the locking groove described above is inserted into a bearing hole. And then, the connecting rod is assembled.

In the embodiment described above, as a material of the split type connecting rod 1, low-carbon alloy steel for machine structural use is used. Medium-carbon alloy steel for machine structural use (for example, Cr—Mo steel having C: 0.33 to 0.38% or Cr steel having C: 0.38 to 0.43%) may be used. As described above, when medium-carbon alloy steel is used, a method of manufacturing a connecting rod is different from the one described above in the following point. In the heat treatment step after formation of the locking grooves 5a and 5b and the concave grooves 21 and 24 by the cold forging, processing (refining process) for improving ductility may be performed instead of the carburizing treatment. Specifically, in the refining processing, oil quenching is performed with the material heated to the austenite range, and, thereafter, tempering is performed. The method of manufacturing a connecting rod according to the present invention is suitable for formation of the locking grooves 5a and 5b and the concave grooves 21 and 24 by cold forging. This is because the material is of low hardness at the point where the cold forging is performed since the heat treatment step is performed after the cold forging.

To form the locking grooves 5a and 5b and the concave grooves 21 and 24 on the inner circumferential surface of the bearing hole 1d, instead of the alloy steel for machine structural use, medium carbon steel (for example, one obtained by adding a small amount of niobium or vanadium to C: 0.30 to 0.45% in order to miniaturize crystal grain size) is used as a material of the split type connecting rod 1. The cooling rate is controlled in the hot forging step to precipitate very small carbide particles to obtain predetermined hardness. The resultant material is then subjected to cold forging.

Furthermore, the locking grooves 5a and 5b and the concave grooves 21 and 24 may be formed in the following manner. Specifically, instead of using ingot material as a material and die-forming the material by hot forging, a powder of alloy steel for machine structural use is die-formed into a shape of a connecting rod, which is sintered and subjected to cold forging as described above. In the case of a manufacturing method of such powder metallurgy, a sintered body that is not yet subjected to cold forging (as-sintered), has air holes remaining therein and is not sufficiently densified. Thus, the sintered body, which has low sintered density and low hardness, is suitable for the cold forging to be subsequently performed.

Specifically, the cold forging after the sintering step is effective not only for forming the locking grooves 5a and 5b and the concave grooves 21 and 24 but also for improving the hardness of the sintered body by eliminating the air holes in the forging step and densifying the sintered body. Moreover, in the case of manufacturing by powder metallurgy, it is possible to obtain a shape close to a product (near net shape) only by putting metal powder that is a raw material in a predetermined die and sintering it. Thus, there is also an advantage that a high yield is achieved (it is not required to discard an unnecessary portion produced in the step of hot-forging the ingot steel).

Effects achieved by the present invention are as described below. Specifically, in the method of manufacturing a connecting rod according to the present invention, the big end part is split in two by fracture, unlike the manufacturing method by which the rod side upper half and the cap side lower half of the big end part of the connecting rod are formed as separate bodies. Thus, it is possible to omit a step of cutting the big end part. Moreover, in the manufacturing method by which the big end part is split in two by fracturing, if the rod side upper half and the cap side lower half are bonded so as to attach fracture surfaces thereof to each other, both halves can be bonded to fit perfectly to each other without misalignment. Thus, it is not required to cut mating surfaces of the halves to form positioning holes or projections. Moreover, drilling of bolt holes for bonding both halves, which has been required for each of the rod side upper half and the cap side lower half, may be performed at one time before fracture-splitting. As described above, various machining steps can be omitted. Thus, the connecting rod can be manufactured at low cost.

Before fracturing the big end part, positioning grooves for fixing the bearing metal are formed by pressing the bearing hole in the big end part by use of a die having projections corresponding to the positioning grooves. Thus, it is not required to perform cutting to form the positioning grooves. From this viewpoint, the connecting rod can be manufactured at a low cost.

Furthermore, unlike a manufacturing method such as die-pressing by applying a compressive load in the axial direction of the bearing hole, the positioning grooves are formed by pressing the inner circumferential surface of the bearing hole in the radial direction of the bearing hole. Thus, not limited to forming positioning grooves opened in an end face in the axial direction of the big end part, the positioning grooves can be formed at arbitrary positions in the axial direction of the bearing hole according to positions of the projections on the die. As described above, when the projections of the bearing metal are fixed to positioning grooves not opened in the end face in the axial direction of the bearing hole, the projections come into contact with both wall surfaces of the positioning grooves in the axial direction of the bearing hole. Accordingly, the projections are firmly fixed in the axial direction, and movement in the axial direction is restricted. Thus, it is only necessary to form one positioning groove for fixing each bearing metal (half) in the axial direction.

Since it is only necessary to form one positioning groove for fixing a bearing metal half in the axial direction, it is only necessary to form one projection corresponding thereto, which is provided on the bearing metal half to be fixed to the positioning groove on the bearing hole. Thus, it is possible to cut manufacturing costs for performing cutting to form the projections of the bearing metal.

Furthermore, the positioning grooves can be formed at arbitrary positions in the axial direction of the bearing hole according to the positions of the projections on the die and a pair of bearing metal halves are inserted into the bearing hole, end faces of respective projections of the pair of bearing metal halves butt a fracture surface of the big end part. Thus, compared with the case where a pair of positioning grooves facing each other across the fracture surface and communicating with each other are formed, a positioning function for the bearing metal halves in the circumferential direction by the positioning grooves is sufficiently achieved.

Moreover, if the peripheral part of the die is configured so as to form notched fracture grooves, together with the positioning grooves on the inner circumferential surface of the bearing hole, the bottoms of the fracture grooves being on the same plane as bottoms of the positioning grooves (if positions of the projections and the convex parts are aligned), the fracture grooves are set to be starting points of fracture when the big end part is fracture-split and fracture of the big end part is facilitated. Moreover, a single continuous fracture surface is likely to be formed at the time of fracture.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A method of manufacturing a connecting rod, the connecting rod including a big end part that has an approximately circular cross section for supporting a crankshaft with a bearing, a small end part for supporting a piston pin with another bearing, and a rod part integrally connecting the big end part to the small end part, wherein the big end part is split in two by fracture on a split surface that passes through an approximately central axis of a bearing hole formed in the big end part and is approximately perpendicular to a center line that extends from the big end part to the small end part and divides the rod part into right and left sides, the big end part is split into a rod side upper half obtained by integrating an upper half of the big end part with the small end part by use of the rod part and a cap side lower half formed of a lower half of the big end part, and the rod side upper half and the cap side lower half are integrated by bonding on the split surface in a state where a bearing metal having an arc-shaped cross section is attached to an inner circumferential surface of the bearing hole, the inner circumferential surface of the bearing hole having positioning grooves prior to fracture of the big end part for fixing the bearing metal, said method comprising the steps of:

inserting an approximately cylindrical die into the bearing hole, the die including a pair of split dies, each of the split dies having a tapered face and a mating surface extending directly from the tapered face downwardly, one of the pair of split dies having projections on an outer circumferential surface thereof corresponding to the positioning grooves on the inner circumferential surface of the bearing hole;

pressing the inner circumferential surface of the bearing hole with the projections by sliding a tapered wedge along the tapered face and moving the pair of split dies in a radial direction of the bearing hole while separating the mating surfaces from each other, wherein the mating surface of one of the pair of split dies is in contact with the mating surface of the other one of the pair of split dies after the pair of split dies is inserted into the bearing hole and before the tapered wedge is slid along the tapered face; and forming the positioning grooves on the inner circumferential surface of the bearing hole.

2. The method of manufacturing a connecting rod according to claim 1, further comprising the steps of:

providing convex parts on the outer circumferential surface of the die for forming fracture grooves on the inner circumferential surface of the bearing hole for facilitating fracture of the big end part, the convex parts extending in the axial direction of the die;

forming the positioning grooves when the inner circumferential surface of the bearing hole is pressed; and forming the fracture grooves in the axial direction on the inner circumferential surface of the bearing hole when the inner circumferential surface of the bearing hole is pressed.

3. The method according to claim 2, further comprising the step of locating the projections on the die at positions spaced from each other in the axial direction to form the positioning grooves on the inner circumferential surface of the bearing hole at positions spaced in the axial direction.

4. The method according to claim 2, further comprising the step of performing a carburizing treatment to the connecting rod after the formation of the positioning grooves and the fracture grooves and prior to fracture of the big end part.

5. The method according to claim 4, further comprising the step of quenching the connecting rod after the carburizing treatment and prior to fracture of the big end part.

6. The method according to claim 5, further comprising the steps of:

setting the connecting rod into a fracture-splitting machine after the quenching step; and applying a force to the big end part to fracture the big end part along the split surface.

7. The method according to claim 1, further comprising the step of locating the projections on the die at positions spaced from each other in the axial direction to form the positioning grooves on the inner circumferential surface of the bearing hole at positions spaced in the axial direction.

8. The method according to claim 1, further comprising the step of performing a carburizing treatment to the connecting rod after the formation of the positioning grooves and the fracture grooves and prior to fracture of the big end part.

9. The method according to claim 8, further comprising the step of quenching the connecting rod after the carburizing treatment and prior to fracture of the big end part.

10. The method according to claim 9, further comprising the steps of:

setting the connecting rod into a fracture-splitting machine after the quenching step; and applying a force to the big end part to fracture the big end part along the split surface.

11. A method of manufacturing a connecting rod, the connecting rod including a big end part having a bearing hole for supporting a crankshaft with a bearing, a small end part for supporting a piston pin with another bearing, and a rod part integrally connecting the big end part to the small end part, said method comprising the steps of:

inserting an approximately cylindrical die into the bearing hole, the die including a pair of split dies, each of the pair of the split dies having a tapered face and a mating surface extending directly from the tapered face downwardly, one of the pair of split dies having projections formed on an outer circumferential surface thereof that correspond to positioning grooves to be formed on an inner circumferential surface of the bearing hole, the positioning grooves being for fixing the bearing within the bearing hole;

pressing the inner circumferential surface of the bearing hole with the projections by sliding a tapered wedge along the tapered face and moving the pair of split dies in a radial direction of the bearing hole while separating the mating surfaces from each other, wherein the mating surface of one of the pair of the split dies is in contact with the mating surface of the other one of the pair of the split dies after the pair of split dies is inserted into the bearing hole and before the tapered wedge is slid along the tapered face; and forming the positioning grooves on the inner circumferential surface of the bearing hole.

12. The method of manufacturing a connecting rod according to claim 11, further comprising the steps of:

providing convex parts on the outer circumferential surface of the die for forming fracture grooves on the inner circumferential surface of the bearing hole for facilitating fracture of the big end part, the convex parts extending in the axial direction of the die;

forming the positioning grooves when the inner circumferential surface of the bearing hole is pressed; and forming the fracture grooves in the axial direction on the inner circumferential surface of the bearing hole when the inner circumferential surface of the bearing hole is pressed.

13. The method according to claim 12, further comprising the step of locating the projections on the die at positions spaced from each other in the axial direction to form the positioning grooves on the inner circumferential surface of the bearing hole at positions spaced in the axial direction.

14. The method according to claim 12, further comprising the step of performing a carburizing treatment to the connecting rod after the formation of the positioning grooves and the fracture grooves and prior to fracture of the big end part.

15. The method according to claim 14, further comprising the step of quenching the connecting rod after the carburizing treatment and prior to fracture of the big end part.

16. The method according to claim 15, further comprising the steps of:

setting the connecting rod into a fracture-splitting machine after the quenching step; and applying a force to the big end part to fracture the big end part along the split surface.

17. The method according to claim 11, further comprising the step of locating the projections on the die at positions spaced from each other in the axial direction to form the positioning grooves on the inner circumferential surface of the bearing hole at positions spaced in the axial direction.

18. The method according to claim 11, further comprising the step of performing a carburizing treatment to the connecting rod after the formation of the positioning grooves and the fracture grooves and prior to fracture of the big end part.

19. The method according to claim 18, further comprising the step of quenching the connecting rod after the carburizing treatment and prior to fracture of the big end part.

20. The method according to claim 19, further comprising the steps of:

setting the connecting rod into a fracture-splitting machine after the quenching step; and applying a force to the big end part to fracture the big end part along the split surface.

\* \* \* \* \*